3,019,557
PROCESS AND PREPARATIONS FOR CONDITIONING SOIL

Aharon Katchalsky, Tel Aviv, and Ignacy Bursztyn, Moshe Rim, and David Vofsi, Rehovoth, Israel, assignors to The Weizmann Institute of Science, Rehovoth, Israel
No Drawing. Filed May 22, 1959, Ser. No. 814,969
9 Claims. (Cl. 47—58)

This invention relates to methods and preparations for conditioning the soil, i.e., improving its physical properties with a view to reclaiming sterile soils for agricultural use, preventing erosion and for similar purposes.

In certain known soil conditioning methods, polyelectrolyte preparations, for example, the one known by the trademark "Krilium," are incorporated in the soil. They flocculate the colloids of the soil if the soil is and remains wet and possesses from the outset a certain amount of colloidal matter. The known methods and preparations have no improving or conditioning effect on sterile, colloid-deficient soils such as sand or desert soil.

The present invention has the object to provide soil-conditioning methods and preparations effective towards arid soils which need protection and conditioning most, mainly those poor in or devoid of natural colloids and mucous matter. These soils are also naturally deficient in nitrogen. The invention has the further object to provide the soil with a store of nitrogen which becomes available to plants when the soil is subsequently planted and wetted, e.g. irrigated.

The invention consists in a method for conditioning arid soils, which consists in producing in situ discrete grains or lumps of soil agglutinated by a nitrogenous hardening binder.

The invention also consists in binder preparations for carrying out the method aforesaid, which have as main constituent a hardening nitrogenous natural or synthetic substance, or mixture of substances, e.g. a proteinic glue such as bone or hide glue, or synthetic resin being in a low state of polymerization and capable of further condensing under the action of solar radiation or in contact with warm air.

Especially useful preparations for the purposes of this invention are aqueous solutions of urea-formaldehyde resin, more particularly those which, in the nephelometric test according to I. Bursztyn (Przemysl Chemiczny Warszawa 10 (1954), p. 193) 5 cc. require the addition of from 2 to 20 cc. of a 30%-by-weight aqueous sodium acetate solution at a temperature of 18° C. in order to assume the standard opacity postulated by that test (invisibility of a mark or sign through a layer of 3 mm. of the solution). Similarly useful are water soluble melamine formaldehyde condensation products, dicyandiamide formaldehyde, guanidine formaldehyde, compounds and mixtures in various ratios of such resins, both mixed in various ratios in the course of their condensation and/or mixed after their production, in short, ready made mixed condensation products which are water-soluble and/or water-miscible and contain nitrogen as chief constituent.

It has been found that soil conditioned in accordance with the invention becomes safe against erosion and turns into earth usable for agriculture, the more so as plants have no difficulties in making available to their nutrition the nitrogen contents of the urea-formaldehyde resin melamine-, dicyandiamide-, and guanidine formaldehyde resins and mixtures thereof, or of the proteins or protein degradation products contained in bone or hide glue.

In the use of the invention for reclaiming shifting desert soils and sand dunes, it is sufficient to create a cover of small soil lumps by the application of the agglutinating preparation in discrete drops. Such a cover need not be coherent, since even a space of 10 cms. or so from lump to lump is sufficient to break the delicate saltation mechanism on which the shift of sand—as opposed to dust transport by wind—depends.

Where the invention serves to prevent erosion, drops of agglutinating preparation are placed in rather more dense rows transversally to the slopes of the terrain. Rain falling on a slope thus pre-conditioned does not run off smoothly and create torrents apt to wash the soil down, but the drops are caught by the transversal rows of soil lumps and seep into the soil each drop where it falls, as is indeed the aim of all soil conservation and water conservation schemes. Such prevention of erision and soil conservation is important not only for agricultural purposes but also for the maintenance of road and railway embankments before a cover of vegetation has had an opportunity to develop.

In another important application of the invention, which is the moisture conservation in the soil, the surface of the soil is completely covered with soil lumps. The moisture evaporation prevention achieved by such a cover is equivalent to that achievable by a "stone-mulch" without producing any of the undesirable side effects of the latter.

A yet other field of application of the invention is the amelioration of the texture or structure of soils that are over-worked or have otherwise been deprived of their optimal structure and colloidal agglutinating matter, e.g. by irreversible powdering by intermittent drought, grinding by tractor wheels and from similar causes. Such soils can have their mucous matter replenished or favourable structure restored by the application of an agglutinating preparation according to the invention before and/or during ploughing.

The invention is illustrated by the following examples to which it is not limited.

Example 1

720 g. of urea are mixed with 1944 g. of formaline (40%-by-weight aqueous formaldehyde solution) and 360 g. of sodium nitrate. By the addition of 14 cc. of 5%-by-weight aqeous potassium hydroxide, the pH of the mixture is brought to 8.2. For condensation and polymerization the mixture is refluxed for one hour, then acidulated with 8 cc. of 5%-by-weight aqueous hydrogen chloride whereby the pH is lowered to 4.9, then the resin is further refluxed until the solution becomes clear.

5 cc. samples of the resin solution are drawn at 10 minute intervals, cooled to 18° C. and titrated with a 30%-by-weight aqueous sodium acetate solution by the nephelometric method according to Bursztyn (see above). When the standard opacity is produced in such a sample by the addition of 10 cc. of the sodium acetate solution, the reaction is interrupted by the addition of 9.5 cc. of 5%-by-weight aqueous KOH and the resin solution is cooled. Its final pH is 7.4.

For use as a soil conditioner this solution is diluted with so much water that its viscosity is of the order of 3 to 6 centipoises, and its content of solids amounts to about 5% by weight.

With such a solution, several experiments were effected:

A. The dilute solution was dropped onto surfaces of loose sand and of loess, the drops falling discretely and hitting the surfaces at approximately equidistant points distributed at random at a mean distance of about 7 cm. from each other. When the sand and loess soil surfaces had dried they were found to be covered by stone-hard lumps lying on, or slightly embedded in, the surface.

B. The strength of the lumps thus formed was measured by separately making up a cylindrical lump of somewhat larger dimensions (5 cm. height and 5 cm. diameter)

and testing its crushing strength. In the case of sand soaked with a 20%-by-weight resin solution (4% by weight of the solution to 96% of sand) the strength after 12 weeks' drying in the sunshine was found to be 8 kg./cm.$^2$. In the case of loess the strength was somewhat smaller, depending on the kind of loess.

C. Long exposure of the resin-agglutinated lumps to sunshine was found not to impair the crushing strength of the lumps or the agglutinating power of the binder. Moreover, the nitrogen content of the soil conditioning preparation remained available to plants.

D. A surface of loose sand exposed to wind of a velocity of several meters per second, such as caused the formation or ripples on the sand surface (a manifestation and indicator of sand transport by the wind), ceased to be affected in this manner, or in any other manner indicating sand transport, after this sand surface had been covered with resin-agglutinated sand lumps, which were created either in situ by dropping the resin solution onto the surface as in experiment A above, or by placing premade lumps (effective population density of lumps per m.$^2$: 100 or more). Thus the sand surface could be stabilized without even nearly covering the surface with lumps (owing to the fact that sand transport by wind depends on a special saltation mechanism which, apparently, was easily broken by the random placement of lumps on the sand surface).

E. A loess soil surface was covered with resin-agglutinated lulmps in rows and the surface then inclined to the horizontal so that the rows ran transversally to the inclination. This surface was then placed under a rain-imitating strong sprinkler side by side with an untreated control loess surface. It was found that the control loess surface developed erosion rills in the slope direction while the pre-conditioned loess surface remained intact, soaking the sprinkled rain quickly up. With stronger sprinkling and stronger inclination the control loess surface was finally washed away while the pre-conditioned soil remained intact.

F. A sand surface and a loess surface were pre-conditioned by being completely covered with resin-agglutinated lumps produced in situ, and then enough water was applied to soak the sand and the loess to a depth of 15 cm. These surfaces were then exposed to the sun side by side with control samples of sand and loess which were not so pre-conditioned. At the end of one week the residual moisture contained in the samples was determined. It was found that the moisture had almost completely vanished from the un-preconditioned samples, but had been conserved at the depth of the pre-conditioned samples.

G. The plant-availability of the resin-nitrogen from the agglutinated lumps was tested by growing corn plants in nutrient-devoid sand, to which nutrients had been added in a controlled manner. Each plant, grown in 4 liters of sand in iron containers, was given 15 g. of potassium phosphate dissolved in the irrigation water. A third of the group (six reduplications for each treatment) received no nitrogen fertilizer at all, another third was given 10 g. of $NH_4NO_3$ per four liters of sand, and the last third was fertilized with resin-agglutinated lumps containing altogether 10 g. of urea-formaldehyde resin. The corn plants growing in the resin-fertilized sand developed as quickly and as perfectly as those growing in the $NH_4NO_3$-fertilized sand (reaching 40 cm. in height in 3 weeks after planting) while the unfertilized plants died shortly after germination.

Example 2

720 g. of urea are dissolved in 2120 g. of formaline and the pH of the solution is adjusted to 8.4 by the addition of 16 cc. of 5%-by-weight aqueous KOH. The solution is refluxed for 40 minutes and then acidulated with 9.5 cc. of 5%-by-weight aqueous HCl whereby the pH is lowered to 4.5. The acidulated resin solution is further refluxed and sample-tested by the nephelometric method as described in Example I. The desired degree of condensation is reached when the standard opacity is produced in a 5 cc. sample of resin solution by 10 cc. of sodium acetate solution. Then the reaction is stopped by the addition of KOH and cooling as described in Example I.

Example 3

1 part-by-weight of urea-formaldehyde resin prepared in accordance with either Example I or Example 2 is admixed with 100 parts-by-weight of a 2%-by-weight aqueous solution of potato starch and the viscous mixture thus obtained is used as a soil conditioner.

Example 4

One mol of melamine was dissolved in a warm aqueous solution of 3 mols of formaldehyde to which a solution of sodium hydroxide was added up till a point when the mixture turned pink owing to added phenolphthalein. The compound was at this pH refluxed for 45 minutes untli one part of the resin tolerated 4 parts of distilled water at a temperature of 25° C. as measured by the aforementioned nephelometric method.

A cylindrical specimen of sand as described in Example I–B containing 1.5% of the aforesaid melamine resin (as solids) and 2% of starch had a green strength (the sand specimen contained 3.75% added moisture) of 0.8 kg./cm.$^2$ and a dry strength (after 12 weeks exposure to sunshine in the open) of 14 kg./cm.$^2$.

Other tests as described in Example I have shown that the performance of minute quantities of melamine formaldehyde resins is at least as good as urea formaldehyde resins.

Example 5

A soil conditioning preparation is prepared in that 40 kg. of bone glue are mixed at 60–80° C. with 60 liters of water and 5 kg. of urea.

In this composition the urea has, inter alia, the function of lowering the viscosity of the solution.

For use the preparation is further diluted with so much water that the solid contents drop to about 5% by weight.

In the foregoing the invention has been described only in connection with preferred embodiments thereof. Many variations and modifications of the principles of our invention within the scope of the description herein are obvious. Accordingly it is preferred that this application be bound not by the specific disclosure herein, but only by the appended claims.

We claim:

1. The method for conditioning moisture-deficient soils which comprises treating the soil with an aqueous nitrogenous hardening binder, thereby producing in situ, discrete agglutinated lumps of soil.

2. The method of claim 1 in which the nitrogenous hardening binder is an aqueous solution of proteinic glue.

3. The method for conditioning moisture-deficient soils which comprises treating the soil with an aqueous nitrogenous hardening binder from the group consisting of an aqueous solution of urea formaldehyde, melamine formaldehyde, dicyandiamide formaldehyde, and guanidine formaldehyde, thereby producing in situ, discrete agglutinated lumps of soil.

4. The method of claim 3 in which the nitrogenous hardening binder is an aqueous melamine formaldehyde tion.

5. The method of claim 3 in which the nitrogenous hardening binder is an aqueous melamine formaldehyde solution.

6. The method of claim 3 in which the nitrogenous hardening binder is an aqueous dicyandiamide formaldehyde solution.

7. The method of claim 3 in which the nitrogenous hardening binder is an aqueous guanidine formaldehyde solution.

8. The method for conditioning moisture-deficient soils which comprises treating the soil with discrete drops of an aqueous nitrogenous hardening binder, thereby producing in situ a non-coherent cover of small agglutinated lumps of soil.

9. The method for conditioning moisture-deficient soils which comprises treating the soil with discrete drops of an aqueous nitrogenous hardening binder from the group consisting of an aqueous solution of urea formaldehyde, melamine formaldehyde, dicyandiamide formaldehyde and guanidine formaldehyde, thereby providing in situ a non-coherent cover of small agglutinated lumps of soil.

References Cited in the file of this patent

UNITED STATES PATENTS

| | | |
|---|---|---|
| 2,625,529 | Hedrick | Jan. 13, 1953 |
| 2,822,643 | Witt | Feb. 11, 1958 |
| 2,860,448 | Carasso | Nov. 18, 1958 |
| 2,901,864 | Hiler | Sept. 1, 1959 |
| 2,957,834 | Moller | Oct. 25, 1960 |

FOREIGN PATENTS

| | | |
|---|---|---|
| 541,954 | Germany | Jan. 16, 1932 |
| 786,265 | Great Britain | Nov. 13, 1957 |

OTHER REFERENCES

Clark et al.: "New Synthetic Nitrogen Fertilizer—Urea-Form," published July 1948 in Industrial and Engineering Chemistry (Magazine), vol. 40, No. 7, pages 1178 through 1183.